Patented Feb. 2, 1954

2,668,150

UNITED STATES PATENT OFFICE 2,668,150

ANTIFOAM COMPOSITIONS AND METHOD OF FOAM INHIBITION

George W. Luvisi, Chicago, Ill., assignor to National Aluminate Corporation, Chicago, Ill., a corporation of Delaware No Drawing. Application March 26, 1951, Serial No. 217,683

16 Claims. (Cl. 252—321)

1

This invention relates to new and improved antifoam compositions and to a new and useful method of preventing, reducing or inhibiting foaming in aqueous systems.

As is well known, foaming is a source of trouble in many industrial processes. One of the difficulties is that the foam produced in such processes occupies space which would normally be available for the compositions being processed and hence reduces the capacity of the apparatus in which the process is being practiced. For example, in one type of process which is used in making soya protein the soya beans are extracted by a solvent to obtain soya bean oil. The meal from which the oil has been extracted is then treated with sodium hydroxide in aqueous solution until the pH is 9.5 to 10.5 and is heated to dissolve the protein present. The heated liquor containing the dissolved protein is then filtered through a screen and passed through a centrifuge to remove the insoluble portion of the meal. The resultant liquor is treated to remove the protein from solution. When the alkaline liquor is centrifuged air becomes whipped into the protein solution in the centrifuge apparatus so that when the liquor is discharged from the centrifuge into a vat a foam is formed. Because of this foam the normal operation requires that the discharge vat be approximately half full of foam and this necessarily reduces the capacity of the equipment.

Similar difficulties are encountered in the aeration of sewage, in the concentration of alkaline materials such as phosphates in multiple effect evaporators, in making water soluble paints containing proteins, in the manufacture of rubber latex used for coatings, in the concentration of waste sulfite liquors and in the manufacture of paper.

One of the objects of the present invention is to provide new and improved compositions for preventing, reducing or inhibiting foam formation.

Another object of the invention is to provide for the application of such compositions in specific processes to obtain new and improved results in the reduction or elimination of foaming. Other objects will appear hereinafter.

In accordance with the invention new and improved defoaming compositions are prepared consisting essentially of a higher fatty acid containing 12 to 30 carbon atoms, a paraffin wax, polyethylene glycol 400 dilaurate, and a high molecular weight water insoluble polyoxypropylene diol or a monoether or diether thereof having a molecular weight of at least 400, preferably within the range of 400 to 3000, all dissolved in a water immiscible hydrophobic liquid, the components of said compositions being employed in proportions sufficient to form a clear solution

2 and the resultant product being self-emulsifiable in water.

The following compositions illustrate the preferred proportions of the aforesaid components for the purpose of the invention.

COMPOSITION "A"

| Percent By Weight | Ingredients |
|---|---|
| 10 | Single pressed stearic acid. |
| 10 | Ucon LB 1715 (Carbide & Carbon Chemicals Corporation). |
| 10 | Polyoxyethylene glycol 400 dilaurate (Glyco Products). |
| 3 | Paraffin wax. |
| 67 | Mineral seal oil. |

COMPOSITION "B"

| Percent by Weight | Ingredients |
|---|---|
| 5 | Single pressed stearic acid. |
| 10 | Ucon LB 1715 (Carbide & Carbon Chemicals Corporation). |
| 10 | Polyoxyethylene glycol 400 dilaurate (Glyco Products). |
| 3 | Paraffin wax. |
| 72 | Mineral seal oil. |

In the foregoing compositions, "single pressed stearic acid" consists of about 43.6% stearic acid, 53.4% palmitic acid and 3.0% oleic acid. Ucon LB 1715 is the monobutyl ether of a polyoxypropylene diol having a molecular weight of approximately 2000 to 2100 derived by the addition of 1,2-propylene oxide to butyl alcohol. The polyoxyethylene gylcol 400 dilaurate is a diester made by esterifying polyoxyethylene glycol having a molecular weight of approximately 400 with lauric acid in the proportions of about one mol of glycol to two moles of lauric acid. The lauric acid used for the esterification can be a commercial lauric acid derived from coconut oil and containing $C_8$, $C_{10}$, $C_{12}$ and $C_{14}$ acids.

The invention will be further illustrated but is not limited by the following examples.

Example I

Soya bean meal which had been previously extracted with a solvent to remove the oil was treated with sodium hydroxide in aqueous solution until the pH was 9.5 to 10.5 and then heated to dissolve the protein in the meal. The heated liquors were filtered through a screen and then passed through a centrifuge to remove the insoluble portion of the meal. During the centrifuging operation which was approximately at room temperature, air became whipped into the composition being processed and the resultant composition as it came from the centrifuge formed a very dense stable foam.

Upon the addition of compositions "A" or "B"

to the soya protein liquor prior to centrifuging in proportions of 0.5 cc. of said compositions per 1000 cc. of said liquor the product was free from foam when it came from the centrifuge.

Example II

Laboratory tests were carried out to evaluate the defoaming compositions of the present invention and to compare them with commercially available defoaming compositions. For this purpose 2 liters of a 4% protein solution prepared as described in Industrial and Engineering Chemistry 36,799 (1944) were passed through a centrifuge and collected in a 4 liter beaker. The centrifuge operated at 20,000 revolutions per minute. The layer of foam on the beaker was measured with a ruler and the rate of breakdown was graphed from readings taken every 5 minutes. A blank showed between 2.5 and 3.5 cm. of foam 30 seconds after all the solution had passed through the centrifuge. In 30 minutes, less than half of the foam layer was destroyed. In each case the protein liquid was heated to 35° C.

At a dosage of ½ cc. per 1000 cc. of the protein liquid a commercial antifoam broke the protein liquid foam completely in 40 minutes. Another commercial antifoam broke the protein liquid foam completely in 20 minutes. Composition "A" inhibited foam formation completely so that the protein liquid had no foam on its surface when it came from the centrifuge. At a dosage of 0.25 cc. per 1000 cc. of protein liquid composition "A" permitted the formation of some foam which had a height of 0.45 cm. 30 seconds after running through the centrifuge but this foam broke in 3 minutes.

The results obtained with composition "B" are generally similar to those obtained with composition "A." As will be apparent these results are far superior to those obtained with the commercial antifoams tested.

Example III

Composition "B" was employed as a defoaming agent in the concentration of 27% disodium-phosphate in aqueous solution to 42% disodium-phosphate in a quadruple effect evaporator. Most of the foaming occurs in the first effect. It was found that 2 ounces of composition "B" were sufficient to prevent foaming over a period of from 5 to 6 hours where 3000 gallons of water were evaporated per hour.

Example IV

Composition "B" was employed in the aeration of sewage as a defoaming agent. It was found that 8 ounces of composition "B" prevented foaming for 2 hours when added to a 10,000 gallon tank of sewage in which the run-off was 700 gallons per hour.

Example V

Composition "B" was employed as a defoaming agent in the acid cleaning of boilers or scaled tubes with hydrochloric acid where foam formed due to the reaction of the hydrochloric acid with carbonates present in the scale and was found to be very effective for this purpose.

Example VI

Composition "A" was employed to prevent foaming in the manufacture of paper by adding one pound per ton of paper manufactured to the paper pulp in the head box just before it passed to the screen of a Fourdrinier machine and was found to be very effective.

It will be understood that the compositions of the invention are applicable to other processes in order to reduce, inhibit or eliminate foaming in aqueous systems. As previously indicated, such processes include the processes described in the foregoing examples as well as the manufacture of water soluble paints, rubber latex used for coatings, the concentration of waste sulfite liquors and other processes involving aqueous systems where foaming is a factor.

If any of the components of the previously described foaming composition are omitted the effectiveness is greatly reduced or lost. If the proportions are changed from the optimum proportions given the effectiveness of the composition is reduced. It will be understood, however, that some change may be made in the proportions without departing from the scope of the invention. For example, the proportion of wax can be varied within the range of 1% to 5% by weight; the proportions of fatty acids can be varied within the range of 5% to 15% by weight; the proportions of polyoxyethylene glycol 400 dilaurate can be varied within the range of about 5% to about 20% by weight; those of the propylene oxide derivative can be varied within the ranges of about 1% to about 25% by weight; and the proportions of the hydrophobic solvent can be varied within the range of about 65% to about 75% by weight of the composition.

The higher fatty acids containing 12 to 30 carbon atoms suitable for the practice of the invention include such acids as lauric, myristic, palmitic, oleic, linoleic, linolenic, stearic, carnaubic, cerotic, melissic and montainic. Especially good results are obtained with commercial fatty acid mixtures such as single pressed stearic acid and S fatty acid (18.7% stearic acid, 22.8% palmitic acid and 58.5% oleic acid) wherein the fatty acids are mixed $C_{16}$ and $C_{18}$ fatty acids.

The polyoxypropylene diol or derivative thereof may be any of the normally liquid, water insoluble, polyoxypropylene diols and monoethers and diethers thereof made from 1,2-propylene oxide and having a molecular weight of at least 400, preferably 400 to approximately 3000. These compounds are commercially available and have previously been used as lubricants. Typical examples are Ucon LB 65, Ucon LB 135, Ucon LB 165, Ucon LB 285, Ucon LB 385, Ucon LB 525, Ucon LB 625, Ucon LB 1145, Ucon LB 1700 (1715), Ucon DLB 47E, Ucon DLB 67E, Ucon DLB 50X, Ucon DLB 200B, Ucon DLB 265BX, Polypropylene glycol 1000, Polypropylene glycol 2025 (all Carbide and Carbon Chemicals Corporation) and Polyglycol P 3000 (Dow Chemical Company). The Ucon LB series are monobutyl ethers of a polyoxypropylene diol made by reacting 1,2-propylene oxide with butyl alcohol. These compositions are normally liquid and the numbers indicate varying viscosities. Ucon LB 60 has a molecular weight of about 400. Ucon LB 1700 (1715) has a molecular weight of about 2000 to 2100. The other Ucon LB compounds listed have intermediate molecular weights. The Ucon DLB series are dibutyl ethers of polyoxypropylene diols. Diethers which are useful for the practice of this invention are also described in U. S. Patent No. 2,520,612. Polypropylene glycol 1200 is a diol made from 1,2-propylene oxide and having a molecular weight of about 1200. Polypropylene glycol 2025 is similar but has a molecular weight of about 2025. Polyglycol P 3000 is a polyoxypropylene glycol having a molecular weight of about 3000. Although the butyl ethers of polyoxypropylene are given as illustrative, other ethers such as methyl, ethyl, propyl, amyl, hexyl, cyclohexyl, phenyl and benzyl monoethers of polyoxypropylene glycol, and the corresponding diethers, can be used. In general, the ethers in which the terminal ether group contains 1 to 7 carbon atoms are preferred because the introduction of more hydrophobic ether groups decreases the dispersibility or spreadibility of the resultant compound on the surface of the liquid being treated.

The paraffin wax may be any of the ordinary types of paraffin wax which consists essentially of high molecular weight saturated hydrocarbons which are insoluble in water, acids or alkalis and soluble in ethyl alcohol, diethyl ether, or chloroform. For the most part, these waxes are derived from petroleum.

The solvent for the other components which is water immiscible and hydrophobic is preferably a mineral oil or any other suitable solvent which is substantially free from hydrophilic groups.

The invention is hereby claimed as follows:

1. A defoaming composition consisting essentially of 5 to 15% by weight of a fatty acid containing 12 to 30 carbon atoms, 1% to 5% by weight of paraffin wax, about 5% to 20% by weight of polyoxyethylene glycol 400 dilaurate and about 1% to 25% by weight of a compound from the group consisting of polyoxypropylene diols having a molecular weight of at least 400 and the monoethers and diethers thereof in which the terminal ether group contains not more than 7 carbon atoms, all dissolved in a water immiscible hydrophobic liquid solvent, the components of said composition being employed in proportions sufficient to form a clear solution in said solvent and the product being self-emulsifiable in water.

2. A defoaming composition consisting essentially of 5 to 10% by weight mixed $C_{16}$ and $C_{18}$ fatty acids, approximately 10% by weight of the dilaurate of polyoxyethylene glycol 400, approximately 10% by weight of a polyoxypropylene diol monobutyl ether having a molecular weight of at least 400 and approximately 1 to 5% by weight of a paraffin wax, all dissolved in about 65 to about 75% by weight of a mineral oil.

3. A defoaming composition consisting essentially of 5 to 10% by weight single pressed stearic acid, approximately 10% by weight of the dilaurate of polyoxyethylene glycol 400, approximately 10% by weight of a polyoxypropylene diol monobutyl ether having a molecular weight of approximately 2000 to 2100 and approximately 3% by weight of a paraffin wax, all dissolved in about 67 to about 72% by weight of a mineral oil.

4. A defoaming composition consisting essentially of about 5% single pressed stearic acid, about 10% by weight of the dilaurate of a polyoxyethylene glycol having a molecular weight of approximately 400, about 10% by weight of a polyoxypropylene diol monobutyl ether having a molecular weight of approximately 2000 to 2100 and about 3% by weight of a paraffin wax, all dissolved in about 72% by weight of a mineral oil.

5. A defoaming composition consisting essentially of about 10% single pressed stearic acid, about 10% by weight of the dilaurate of a polyoxyethylene glycol having a molecular weight of approximately 400, about 10% by weight of a polyoxypropylene diol monobutyl ether having a molecular weight of approximately 2000 to 2100 and about 3% by weight of a paraffin wax, all dissolved in about 67% by weight of a mineral oil.

6. A method of defoaming aqueous liquids which are normally susceptible to foaming which comprises incorporating with said liquids a foam inhibiting quantity of a defoaming composition consisting essentially of 5 to 15% by weight of a higher fatty acid containing 12 to 30 carbon atoms, 1% to 5% by weight of a paraffin wax, about 5% to about 20% by weight of polyoxyethylene glycol 400 dilaurate and about 1% to about 25% by weight of a high molecular weight water insoluble normally liquid compound from the group consisting of polyoxypropylene diols having a molecular weight of at least 400 and the monoethers and diethers thereof in which the terminal ether groups contain not more than 7 carbon atoms, all dissolved in a water immiscible normally liquid hydrophobic solvent, the components of said composition being employed in proportions sufficient to form a clear solution in said solvent and the product being self-emulsifiable in water.

7. A method of defoaming aqueous liquids normally susceptible to foaming which comprises incorporating with said liquids a quantity of a defoaming composition consisting essentially of 5 to 10% by weight of mixed $C_{16}$ and $C_{18}$ fatty acids, approximately 5% to 20% by weight of the dilaurate of a polyoxyethylene glycol having a molecular weight of about 400, approximately 1% to 25% by weight of a compound from the group consisting of polyoxypropylene diols having a molecular weight within the range of approximately 400 to approximately 3000 and the monoethers and diethers thereof in which the terminal ether groups contain not more than 7 carbon atoms and approximately 1% to 5% by weight of a paraffin wax, all dissolved in about 65% to about 75% by weight of a water immiscible normally liquid hydrophobic solvent.

8. A method of defoaming aqueous protein liquids normally susceptible to foaming which comprises incorporating with said liquids a foam inhibiting quantity of a defoaming composition consisting essentially of 5 to 15% by weight of a higher fatty acid containing 12 to 30 carbon atoms, 1% to 5% by weight of a paraffin wax, about 5% to about 20% by weight of polyoxyethylene glycol 400 dilaurate and about 1% to about 25% by weight of a high molecular weight water insoluble normally liquid compound from the group consisting of polyoxypropylene diols having a molecular weight within the range of approximately 400 to approximately 3000 and the monoethers and diethers thereof in which the terminal ether groups contain not more than 7 carbon atoms, all dissolved in a water immiscible normally liquid hydrophobic solvent, the components of said composition being employed in proportions sufficient to form a clear solution in said solvent and the product being self-emulsifiable in water.

9. A method of defoaming aqueous solutions of phosphates during the concentration thereof which comprises incorporating with said solutions a foam inhibiting quantity of a defoaming composition consisting essentially of 5% to 15% by weight of a higher fatty acid containing 12 to 30 carbon atoms, 1% to 5% by weight of a paraffin wax, 5% to 20% by weight of polyoxyethylene glycol 400 dilaurate and 1% to 25% by weight of a high molecular weight water insoluble normally liquid compound from the group consisting of polyoxypropylene diols having a molecular weight within the range of approximately 400 to approximately 3000 and the monoethers and diethers thereof in which the terminal ether groups contain not more than 7 carbon atoms, all dissolved in a water immiscible normally liquid hydrophobic solvent, the components of said composition being employed in proportions sufficient to form a clear solution in said solvent and the product being self-emulsifiable in water.

10. A method of defoaming aqueous sewage liquids which comprises incorporating therewith a foam inhibiting quantity of a defoaming composition consisting essentially of 5% to 15% by weight of a higher fatty acid containing 12 to 30 carbon atoms, 1% to 5% by weight of a paraffin wax, 5% to 20% by weight of polyoxyethylene glycol 400 dilaurate and 1% to 25% by weight of a high molecular weight water insoluble normally liquid compound from the group consisting of polyoxypropylene diols having a molecular weight within the range of approximately 400 to approximately 3000 and the monoethers and diethers thereof in which the terminal ether groups contain not more than 7 carbon atoms, all dissolved in a water immiscible normally liquid hydrophobic solvent, the components of said composition being employed in proportions sufficient to form a clear solution in said solvent and the product being self-emulsifiable in water.

11. A method of preventing foaming during the acid cleaning of boilers and scaled tubes with hydrochloric acid which comprises incorporating with the hydrochloric acid a foam inhibiting quantity of a defoaming composition consisting essentially of 5 to 15% by weight of a higher fatty acid containing 12 to 30 carbon atoms, 1% to 5% by weight of a paraffin wax, about 5% to about 20% by weight of polyoxyethylene glycol 400 dilaurate and about 1% to about 25% by weight of a high molecular weight water insoluble normally liquid compound from the group consisting of polyoxypropylene diols having a molecular weight within the range of approximately 400 to approximately 3000 and the monoethers and diethers thereof in which the terminal ether groups contain not more than 7 carbon atoms, all dissolved in a water immiscible normally liquid hydrophobic solvent, the components of said composition being employed in proportions sufficient to form a clear solution in said solvent and the product being self-emulsifiable in water.

12. A method of defoaming fibers pulped in water and normally susceptible to foaming which comprises incorporating with said pulped fibers a foam inhibiting quantity of a defoaming composition consisting essentially of 5 to 15% by weight of a higher fatty acid containing 12 to 30 carbon atoms, 1% to 5% by weight of a paraffin wax, about 5% to about 20% by weight of polyoxyethylene glycol 400 dilaurate and about 1% to about 25% by weight of a high molecular weight water insoluble normally liquid compound from the group consisting of polyoxypropylene diols having a molecular weight within the range of approximately 400 to approximately 3000 and the monoethers and diethers thereof in which the terminal ether groups contain not more than 7 carbon atoms, all dissolved in a water immiscible normally liquid hydrophobic solvent, the components of said composition being employed in proportions sufficient to form a clear solution in said solvent and the product being self-emulsifiable in water.

13. A method of preventing foaming in aqueous alkaline soya protein liquors during centrifuging which comprises incorporating with said liquors before centrifuging a quantity of a defoaming composition consisting essentially of 5 to 10% by weight mixed $C_{16}$ and $C_{18}$ fatty acids, approximately 10% by weight of the dilaurate of a polyoxyethylene glycol having a molecular weight of about 400, approximately 10% by weight of a polyoxypropylene diol monobutyl ether having a molecular weight of at least 400 and approximately 1% to 5% by weight of a paraffin wax, all dissolved in about 65 to about 75% by weight of a mineral oil, said quantity corresponding to approximately 0.5 cc. per 1000 cc. of said protein liquors.

14. A method of inhibiting foaming during the manufacture of paper on a Fourdrinier machine which comprises adding to an aqueous suspension of the paper pulp prior to the formation of the paper a quantity of a defoaming composition consisting essentially of 5 to 10% by weight mixed $C_{16}$ and $C_{18}$ fatty acids, approximately 10% by weight of the dilaurate of a polyoxyethylene glycol having a molecular weight of about 400, approximately 10% by weight of a polyoxypropylene diol monobutyl ether having a molecular weight of at least 400 and approximately 1% to 5% by weight of a paraffin wax, all dissolved in about 65% to about 75% by weight of a mineral oil, said quantity corresponding to about one pound per 1000 pounds of paper manufactured.

15. A method of concentrating alkaline solutions of phosphates under conditions adapted to reduce foaming which comprises incorporating with said solutions a quantity of a defoaming composition consisting essentially of 5 to 10% by weight of mixed $C_{16}$ and $C_{18}$ fatty acids, approximately 10% by weight of the dilaurate of a polyoxyethylene glycol having a molecular weight of about 400, approximately 10% by weight of a polyoxypropylene diol monobutyl ether having a molecular weight of at least 400 and approximately 1% to 5% by weight of a paraffin wax, all dissolved in about 65% to about 75% by weight of a mineral oil, said quantity corresponding to approximately 2 ounces per 3000 gallons of water evaporated per hour.

16. A method of aerating sewage which comprises incorporating therewith a quantity of a defoaming composition consisting essentially of 5 to 10% by weight of mixed $C_{16}$ and $C_{18}$ fatty acids, approximately 10% by weight of the dilaurate of a polyoxyethylene glycol having a molecular weight of about 400, approximately 10% by weight of a polyoxypropylene diol monobutyl ether having a molecular weight of at least 400 and approximately 1% to 5% by weight of a paraffin wax, all dissolved in about 65% to about 75% by weight of a mineral oil, said quantity corresponding to approximately 8 ounces of said composition per 10,000 gallons of sewage.

GEORGE W. LUVISI.

References Cited in the file of this patent

UNITED STATES PATENTS

| Number | Name | Date |
| --- | --- | --- |
| 2,052,164 | Buc | Aug. 25, 1936 |
| 2,108,912 | Young | Feb. 22, 1938 |
| 2,220,700 | Atwood | Nov. 5, 1940 |
| 2,390,212 | Fritz | Dec. 4, 1945 |
| 2,429,030 | Rawling | Oct. 14, 1947 |
| 2,609,344 | Johnson | Sept. 2, 1952 |